US012782102B2

(12) United States Patent
Baxter

(10) Patent No.: US 12,782,102 B2
(45) Date of Patent: Nov. 3, 2026

(54) SETTLED DUST MEASUREMENT DEVICE USING CAPACITANCE

(71) Applicant: Dust Company, Inc., Raleigh, NC (US)

(72) Inventor: Robert W. Baxter, Raleigh, NC (US)

(73) Assignee: Dust Company, Inc., Raleigh, NC (US)

( * ) Notice: Subject to any disclaimer, the term of this patent is extended or adjusted under 35 U.S.C. 154(b) by 75 days.

(21) Appl. No.: 18/757,617

(22) Filed: Jun. 28, 2024

(65) Prior Publication Data

US 2025/0003728 A1 Jan. 2, 2025

Related U.S. Application Data

(60) Provisional application No. 63/560,889, filed on Mar. 4, 2024, provisional application No. 63/510,992, filed on Jun. 29, 2023.

(51) Int. Cl.
*G01B 7/06* (2006.01)

(52) U.S. Cl.
CPC .................................... *G01B 7/085* (2013.01)

(58) Field of Classification Search
CPC ... G01R 27/2605; G06F 3/0428; G06F 3/044; G06F 3/0441; G06F 3/0442; G06F 3/0443; G06F 3/0444; G06F 3/0445; G06F 3/0446; G06F 3/0447; G06F 3/0448
See application file for complete search history.

(56) References Cited

U.S. PATENT DOCUMENTS

| | | | |
|---|---|---|---|
| 6,850,328 B1 | 2/2005 | Leirfall | |
| 7,696,890 B2 | 4/2010 | Bandholz et al. | |
| 10,585,027 B2 | 3/2020 | Ho et al. | |
| 10,921,250 B2 | 2/2021 | Parsons et al. | |
| 11,262,300 B2 | 3/2022 | Parsons et al. | |
| 11,300,493 B2 | 4/2022 | Armbruster et al. | |
| 2001/0048312 A1 | 12/2001 | Nakamura | |
| 2006/0055415 A1* | 3/2006 | Takita | G01D 5/2417 324/658 |
| 2007/0044579 A1 | 3/2007 | Yamaguchi et al. | |
| 2008/0100826 A1 | 5/2008 | Sharpe | |
| 2009/0045967 A1* | 2/2009 | Bandholz | G01N 15/0656 340/627 |
| 2021/0164771 A1 | 6/2021 | NoËl | |
| 2021/0247290 A1 | 8/2021 | Tsai et al. | |

OTHER PUBLICATIONS

International Search Report and Written Opinion corresponding to PCT/US2024/035943; Dated Oct. 1, 2024, (12 pages).
International Preliminary Report on Patentability corresponding to PCT/US2024/035943; Mailed Jan. 8, 2026, (7 pp).

* cited by examiner

*Primary Examiner* — Tung X Nguyen
(74) *Attorney, Agent, or Firm* — Myers Bigel, P.A.

(57) ABSTRACT

A method includes collecting native dust on a collection probe having a reading probe spaced apart therefrom; generating, by a capacitance sensor comprising first and second input leads that are coupled to the collection probe and the reading probe, respectively, a signal that is representative of a capacitance between the collection probe and the reading probe; and correlating the signal with a depth of the native dust on the collection probe.

16 Claims, 6 Drawing Sheets

SETTLED DUST MEASUREMENT DEVICE USING CAPACITANCE

RELATED APPLICATIONS

The present application claims priority from and the benefit of U.S. Provisional Patent Application No. 63/510,992, filed Jun. 29, 2023, and U.S. Provisional Patent Application No. 63/560,889, filed Mar. 4, 2024. The disclosures of which are hereby incorporated herein by reference in its entirety.

BACKGROUND

In recent years explosive dust, or combustible dust, has become a focus for agencies, such as OSHA, MSHA, NFPA, etc. Many rules and regulations are being written worldwide to address combustible dust situations. Searches for "combustible dust" or "dust explosion" typically turn up numerous records. The biggest efforts to date are being spent on preventative measures and hazard control. Preventive measures may include more housekeeping, general maintenance, and making sure that equipment is compatible with the area. Hazard control includes devices and/or systems to prevent an explosion, limit the damage of the explosion, and/or reduce/minimize the propagation of the explosion.

But increased house cleaning and maintenance typically requires more people and more equipment. Many locations in a facility are not safe or not easy to get to by a human. In some cases, equipment manufacturers have developed fans and other devices to help keep dust from building up on plant equipment or surfaces. The energy consumption of the large fans can be a big cost to the facility.

The missing component is an effective method and device to measure the dust build-up to either notify plant personnel that cleaning is needed or to turn on automated cleaning devices, such as fans or other cleaning devices when necessary. Being able to monitor the amount of settled dust may attack the problem of explosive or combustible dust at the most fundamental level.

Optical methods to monitor settled dust levels have been developed. But there are many types of dust and applications; therefore, other techniques may be needed to address application needs where optical sensor techniques may not be as effective.

SUMMARY

In some embodiments of the inventive concept, a system comprises: a collection probe that is configured to collect native dust thereon; a reading probe that is configurable in a position spaced apart from the collection probe; and a capacitance sensor comprising first and second input leads that are coupled to the collection probe and the reading probe, respectively, that is configured to generate a signal that is representative of a capacitance between the collection probe and the reading probe; a processor; and a memory coupled to the processor and comprising computer readable program code embodied in the memory that is executable by the processor to perform operations comprising: correlating the signal with a depth of the native dust on the collection probe.

In other embodiments, the operations further comprise: calibrating the correlation of the signal with the depth of the native dust using a test dust having a known thickness.

In still other embodiments, calibrating the correlation of the signal with the depth of the native dust comprises:

placing a slide of the test dust between the collection probe and the reading probe; wherein the capacitance sensor is further configured to generate a calibration signal that is representative of a calibration capacitance between the collection probe and the reading probe with the slide of test dust therebetween.

In still other embodiments, calibrating the correlation of the signal with the depth of the native dust further comprises: generating a calibration coefficient that is representative of a relationship between the calibration signal and the known thickness of the test dust.

In still other embodiments, correlating the signal with the depth of the native dust comprises: correlating the signal with the depth of the native dust using the calibration coefficient.

In still other embodiments, the test dust comprises a non-native dust.

In still other embodiments, the test dust comprises a native dust.

In still other embodiments, calibrating the correlation of the signal with the depth of the native dust comprises: sequentially placing a plurality of slides of the test dust between the collection probe and the reading probe, the test dust on each of the plurality of slides having a different known thickness; wherein the capacitance sensor is further configured to generate a plurality of calibration signals that are each representative of the calibration capacitance between the collection probe and the reading probe with the respective slide of test dust therebetween.

In still other embodiments, calibrating the correlation of the signal with the depth of the native dust further comprises: generating a plurality of calibration coefficients that is representative of a relationship between the plurality of calibration signals and the plurality of known thicknesses of the test dust, respectively.

In still other embodiments, correlating the signal with the depth of the native dust comprises: correlating the signal with the depth of the native dust using one of the plurality of coefficients that is associated with one of the plurality of calibration signals that is closest in value to the signal.

In still other embodiments, the operations further comprise: generating a notification when a depth of the native dust satisfies a threshold.

In some embodiments of the inventive concept, a method comprises: collecting native dust on a collection probe having a reading probe spaced apart therefrom; generating, by a capacitance sensor comprising first and second input leads that are coupled to the collection probe and the reading probe, respectively, a signal that is representative of a capacitance between the collection probe and the reading probe; and correlating the signal with a depth of the native dust on the collection probe.

In further embodiments, the method further comprises: calibrating the correlation of the signal with the depth of the native dust using a test dust having a known thickness.

In still further embodiments, calibrating the correlation of the signal with the depth of the native dust comprises: placing a slide of the test dust between the collection probe and the reading probe; and generating, by the capacitance sensor, a calibration signal that is representative of a calibration capacitance between the collection probe and the reading probe with the slide of test dust therebetween.

In still further embodiments, calibrating the correlation of the signal with the depth of the native dust further comprises: generating a calibration coefficient that is representative of a relationship between the calibration signal and the known thickness of the test dust.

In still further embodiments, correlating the signal with the depth of the native dust comprises: correlating the signal with the depth of the native dust using the calibration coefficient.

In still further embodiments, the test dust comprises a non-native dust.

In still further embodiments, the test dust comprises a native dust.

In still further embodiments, calibrating the correlation of the signal with the depth of the native dust comprises: sequentially placing a plurality of slides of the test dust between the collection probe and the reading probe, the test dust on each of the plurality of slides having a different known thickness; generating, by the capacitance sensor, a plurality of calibration signals that are each representative of a calibration capacitance between the collection probe and the reading probe with the respective slide of test dust therebetween; and generating a plurality of calibration coefficients that is representative of a relationship between the plurality of calibration signals and the plurality of known thicknesses of the test dust, respectively; wherein correlating the signal with the depth of the native dust comprises: correlating the signal with the depth of the native dust using one of the plurality of coefficients that is associated with one of the plurality of calibration signals that is closest in value to the signal.

In still further embodiments, the method further comprises: generating a notification when a depth of the native dust satisfies a threshold Other methods, systems, computer program products and/or apparatus according to embodiments of the inventive concept will be or become apparent to one with skill in the art upon review of the following drawings and detailed description. It is intended that all such additional methods, systems, computer program products, and/or apparatus be included within this description, be within the scope of the present invention, and be protected by the accompanying claims. It is noted that aspects of the invention described with respect to one embodiment, may be incorporated in a different embodiment although not specifically described relative thereto. That is, all embodiments and/or features of any embodiment can be combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

Figure 1:
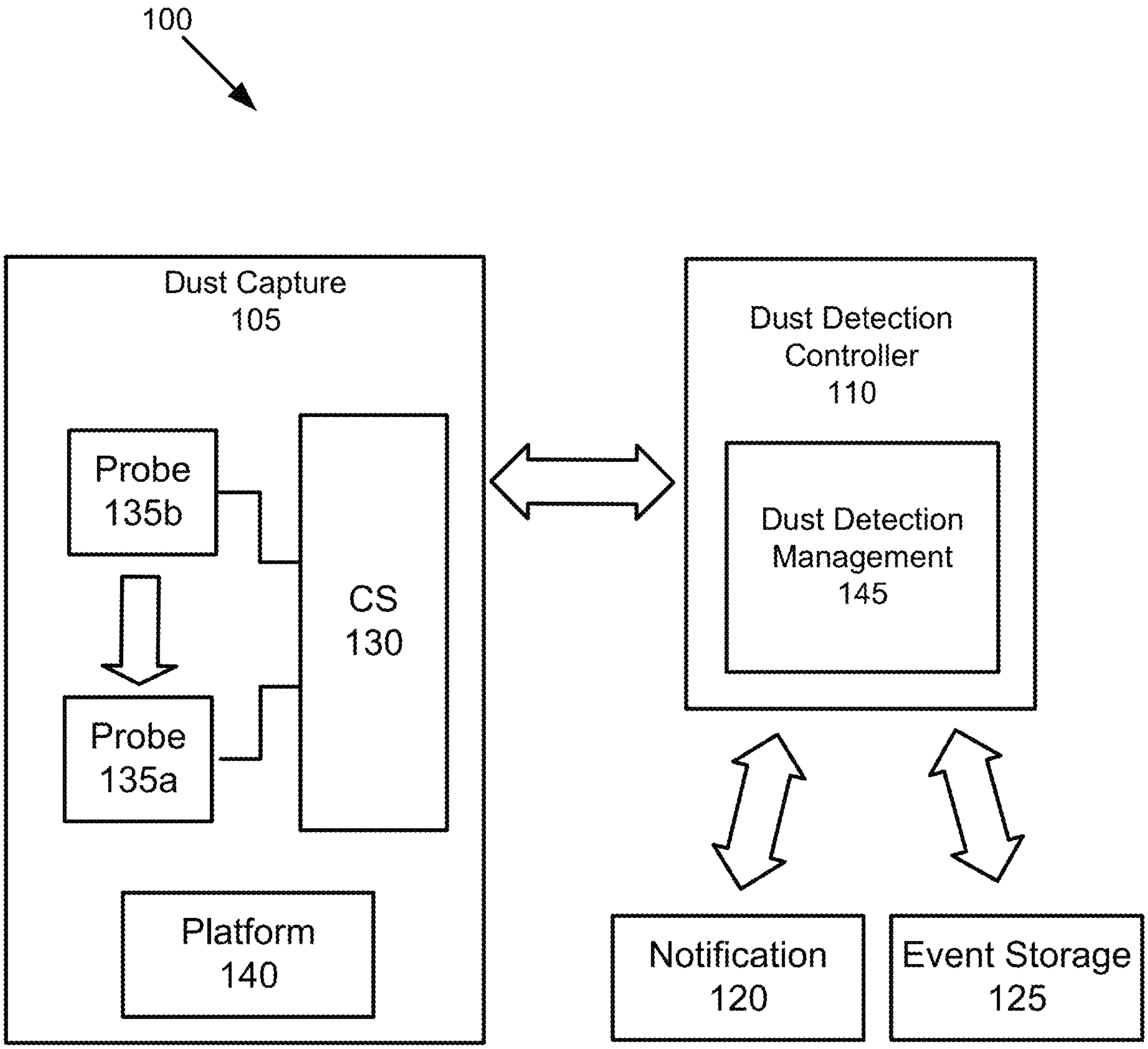
FIG. 1 is a block diagram that illustrates a dust measurement device and system according to some embodiments of the inventive concept.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Some embodiments of the inventive concept stem realization that existing techniques to manage buildup of explosive or combustible dust in a facility may be expensive both in terms of human risk and/or effort as well as economic in terms of running mitigation equipment, such as fans.

Some embodiments of the inventive concept may provide systems and methods for calibrating and measuring the amount of settled dust on a platform surface using a sensor or detector. The detection method may use a dust detection controller in conjunction with a capacitance sensor to periodically or continuously measure capacitance between a collection probe on which native dust may collect and a reading probe that are spaced apart from each other. A reference reading may be taken when the surface of the collection probe is clean so that a determination can be made of the amount of capacitance that is attributable to the accumulation dust on the collection probe. The change in capacitance represents the amount of settled dust. Capacitance may be affected by different parameters, such as a material's dielectric constant. Therefore, a settled dust measurement device and system, according to some embodiments, may provide a calibration method/procedure based on a non-native dust, e.g., a material that is different than the native dust that is found in a deployed environment and/or a calibration method/procedure that is based on native dust that is found in a deployed environment to allow the device and system to adjust to or account for site specific variables and characteristics. Some applications may require different ranges of operation for the capacitance sensor, probe design/size, site specific shapes, enclosure types and/or mounting options. Any site or application specific requirements does not change the method of settled dust detection according to some embodiments of the inventive concept.

The settled dust measurement device and system can have a fixed surface, where the dust settles directly on the collection probe or a collection surface just above the probe. The collection probe may be coated with a protective layer based on the needs of the application. The settled dust measurement device and system may also have collection probe that comprises a moving collection surface for dust to settle on or a reading probe which moves into place over the collection probe to take capacitance readings. The capacitance sensor can be configured to continuously read the level of settled dust through capacitance measurements, take capacitance measurements to evaluate the thickness of accumulated dust periodically, or on-demand.

The settled dust measurement device and system may be configured to conduct internal quality assurance checks to validate the capacitance results and verify internal operations. All capacitance readings and dust thickness determinations data may be stored locally or remotely and may be available for local display or local status indications and notifications. The data may also be transmitted to edge or cloud servers for long term data storage, further evaluation, display and/or notifications. Thus, the system configuration may be tailored or customized based on facility, application, or regulator requirements. Depending on the application demands, the settled dust measurement device and system may be battery operated or powered directly.

Referring now to FIG. 1, a dust measurement system 100 for measuring the amount of settled dust on a surface, such as a platform 140, includes a dust capture apparatus 105 and a dust detection controller 110. The dust measurement system 100 can have hard wired communications and power or the communication can be wireless and the system may be battery powered in accordance with various embodiments. The dust detection controller 110 may communicate locally with control equipment for local control or notifications 120 and/or push data to a server 125 (edge or cloud) for long term storage, reporting and notifications. The settled dust information contained in a notification or alarm 120 can be used to inform local personnel that manual cleaning is required or to turn on automated cleaning equipment.

The dust capture apparatus 105 may comprise a capacitance sensor 130 with first and second input leads that are coupled to a collection probe 135*a* and a reading probe 135*b*, respectively. In the example shown in FIG. 1, the collection probe 135*a* is configured to collect settled dust thereon. The reading probe 135*b* may be configured to be positioned over the collection probe 135*a* to perform a capacitance measurement using the capacitance sensor 130 with the dust collected on the collection probe 135*a* being between the collection probe 135*a* and reading probe 135*b* and serving as a dielectric. The reading probe 135*b* may also be configured in a non-reading position allowing the collection probe 135*a* to accumulate dust thereon. It will be understood that the positional relationship between the collection probe 135*a* and the reading probe 135*b* is an example and other positional arrangements can be used to accommodate different requirements associated with different environments in which the dust measurement system 100 may be deployed. The capacitance sensor 130 may also take a capacitance measurement with both the collection probe 135*a* and reading probe 135*b* free from any dust to establish a baseline capacitance. The difference between the capacitance measurements taken when dust has accumulated on the collection probe 135*a* and when the collection probe 135*a* is free from dust may be attributed to the accumulation of the dust. As a result, the capacitance attributed to the accumulation on of dust may be converted to a dust thickness through curve fitting techniques in which capacitance measurements are obtained for known dust thicknesses using, for example, curve fitting techniques, such as interpolation, smoothing, extrapolation, and statistical techniques, such as regression, lease squares regression Bayesian regression, and the like.

The dust detection management module 145 may be configured to manage the operation of the dust capture apparatus 105 including managing and updating the parameters and coefficients associated with correlating a capacitance measurement signal with a depth of dust that has accumulated on the collection probe 135*a*.

Figure 2:
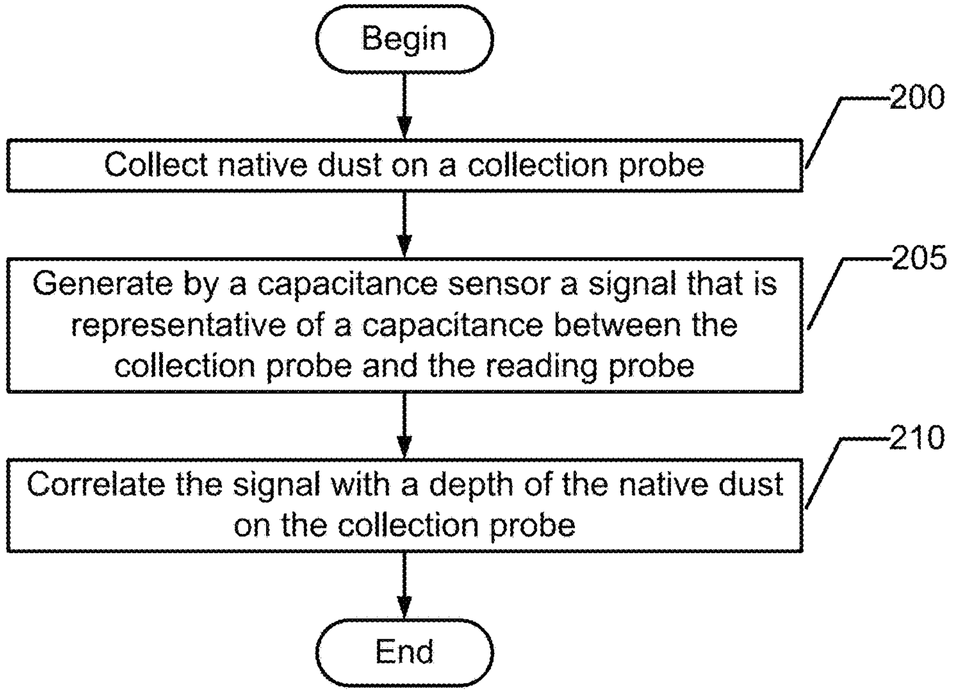
FIGS. 2-3 are flowcharts that illustrate operations of the dust measurement device and system according to some embodiments of the inventive concept.
Figure 3:
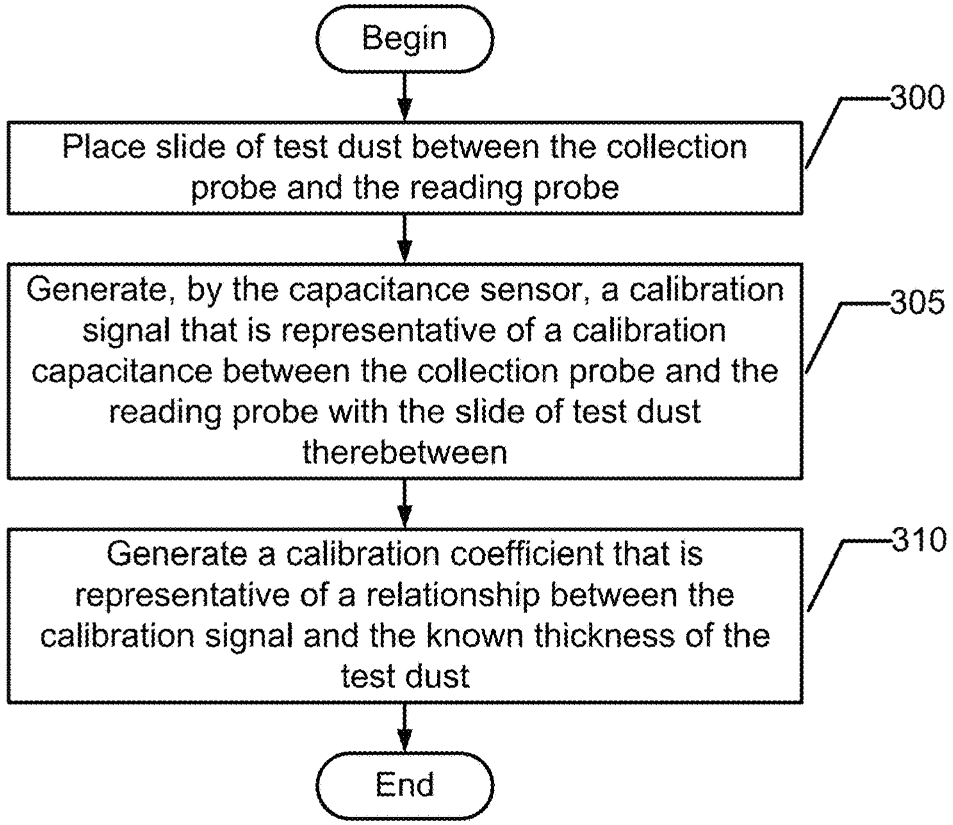

FIGS. 2-3 are flowcharts that illustrate operations of the dust measurement device and system according to some embodiments of the inventive concept. Operations begin at block 200 where native dust is collected on a collection probe 135*a*. The capacitance sensor 130 generates a signal that is representative of a capacitance between the collection probe 135*a* and the reading probe 135*b* with the accumulated dust therebetween at block 205. The signal is correlated with a depth of the native dust on the collection probe 135*a* at block 210.

As described above, the dust measurement system 110 may be calibrated with samples of known dust thickness so that the capacitance measurements taken thereon can be used to create an association between the measured capacitance values and the dust thickness values. In some embodiments, curve fitting techniques can be used to create a curve that represents the relationship between capacitance and dust thickness. In other embodiments, various coefficients can be derived that represent the relationship between the capacitance measurement and the dust thickness at various dust thickness levels. A coefficient associated with a capacitance measurement (resulting from a signal output from the capacitance sensor) nearest a newly measured capacitance measurement for an unknown dust thickness can be used to calculate a prediction of the unknown dust thickness. Relationship between capacitance and dust thickness may not be linear over the range of dust thickness for a given application. As a result, the coefficients used for determining dust thickness based on measured capacitance (as represented by the output signal from the capacitance sensor 130) may vary based on the measured capacitance value.

The dust measurement device and system may allow the user to define and set an alarm or notification level so that a notification is generated and communicated to the appropriate parties when the thickness of the dust is determined to satisfy a threshold. This may be in the form of one or more of an optical alert, an audible alarm, an email, an SMS message, an alert on a web page, or the like. Other types of alerts or notifications may be used in accordance with different embodiments of the inventive concept.

Referring to FIG. 3, operations begin at block 300 where a slide of test dust is placed between the collection probe 135*a* and the reading probe 135*b*. The capacitance sensor 130 generates a calibration signal that is representative of a calibration capacitance between the collection probe and the reading probe with the slide of test dust therebetween at block 305. A calibration coefficient that is representative of the relationship between the calibration signal and the known thickness of the test dust is generated at block 310. The operations of FIG. 3 may be sequentially repeated for different slides of test dust having different known thicknesses. In accordance with different embodiments, the test dust may be a non-native dust, i.e., a dust not associated with a particular deployed environment, or a native dust, i.e., a dust that is associated with a particular deployed environment for the dust measurement device and system.

Embodiments of the inventive concept may be further described by way of example. To confirm that capacitance works as a technique that can be used for settled dust measurement, two capacitance sensors were tested against different levels of dust. For the purposes of this testing all "dust" was baby powder. Testing was performed using a capacitance sensor with an analog output. Other variations on the configuration may also be used to achieve the same or similar results in accordance with different embodiments.

Figure 4:
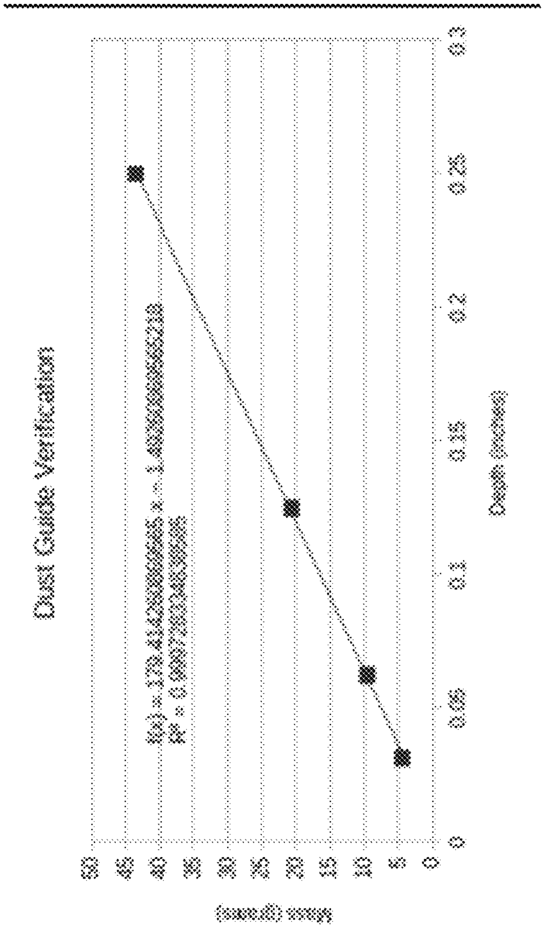
FIGS. 4-6 are graphs that illustrate operations in calibrating the dust measurement device and system according to some embodiments of the inventive concept.
Figure 5:
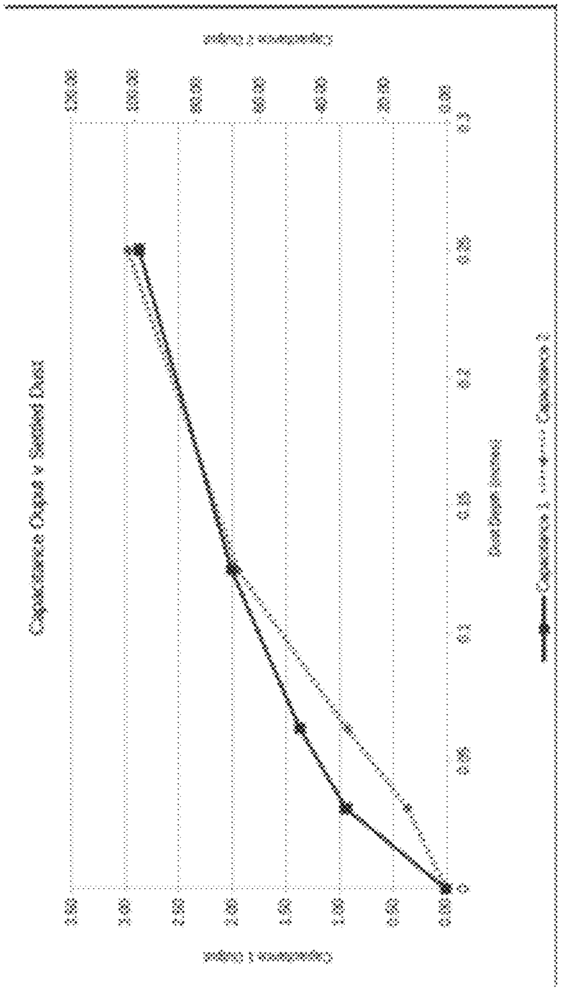

To ensure that the dust depth was accurate, 3"×5" guides were 3D printed to specific heights: ¼", ⅛", 1/16", and 1/32". These guides were glued to 6"×4" thin plastic slides. Powder was poured into the middle of the guides and a straight edge was used to drag across each guide to make sure the powder was the same height as the guide. To confirm that the guides, and therefore the depth, were consistent, each slide was weighed before and after powder was added to each slide. This resulted in the total mass of powder on each slide. Then the net mass of powder was plotted against the guide height for each slide. The results are in the chart of FIG. 4. Although both sensors were designed for other specific applications, both sensors produced a trend with the depth of the dust on each slide as shown in FIG. 5.

Because different dust materials have different properties and dielectric constants, a site specific calibration, i.e., a calibration using native dust associated with a particular deployed environment, may be performed to ensure accurate correlations.

Figure 6:
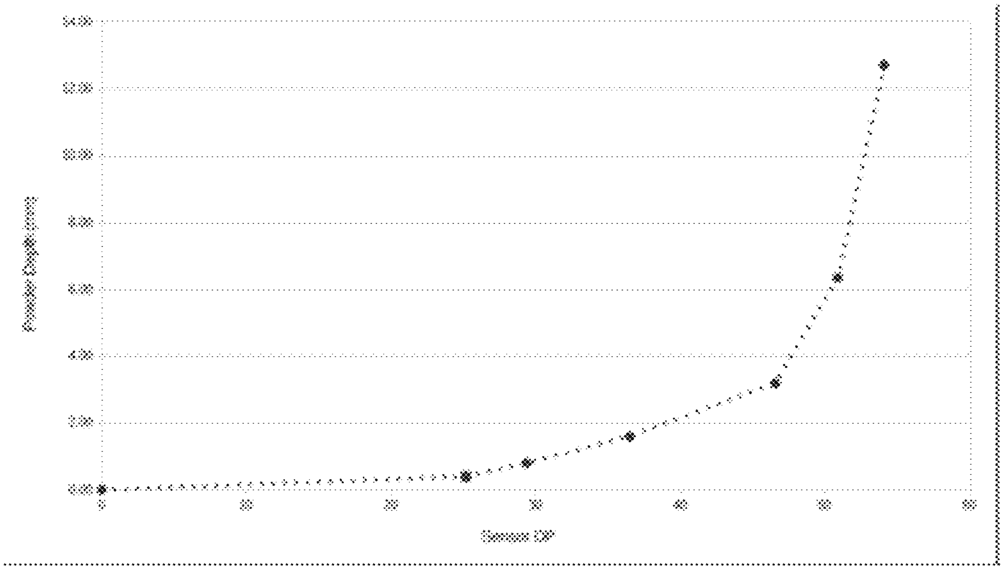

The above-described testing did not provide an indication of the resolution or range of the settled dust measurement device for dust alone because the plastic slide material used up a relatively large portion of the operating range. Therefore, more testing was performed on a single sensor design with no slide. Special jigs were designed and 3D printed that allows dust only depths on the sensor at 1/64", 1/32", 1/16", ⅛", ¼" and ½". The results of this testing are shown in the chart of FIG. 6. Note that the dust depths have been converted to millimeters. There were adjustments made to the sensor's range of operation to optimize or configure it for the particular dust (powder) used in the testing. These same adjustments can be made on embodiments of the settled dust measurement device to ensure accurate performance on specific dust types and monitoring demands.

Capacitance is dependent on the dielectric constant of the material it is measuring and the density of the settled dust. Ambient conditions such as temperature humidity can also affect a capacitance measurement because their variations can change the material's dielectric constant. Therefore, to get a more accurate indication of the dust depth for a specific application, an on-site calibration may be conducted using the native dust or create a correction to the output reading of a standard capacitance reference.

The on-site calibration can be accomplished using depth guides, much like what was used in the above-described testing. The slides may allow the user to create a known depth of settled dust. Best results may be obtained when the settled dust is physically similar to normal settled dust in the area versus being packed down or intentionally "fluffed." Several levels may be recommended, but it may be desirable to have a guide that that is as close as possible to the alarm or action depth for the application. Other options may be used as data is collected on different materials.

The standard calibration references may include reference "slides" with known capacitance. The reference slides may be configured to cover multiple points over the entire operating range of the dust measurement device and system. The reference slides can be used periodically as manual checks of the overall monitoring system.

Automatic QA checks may be configured in the dust measurement device and system. These may be equivalent to "zero/span" checks and/or internal QA checks to confirm the functionality of internal components.

Figure 7:
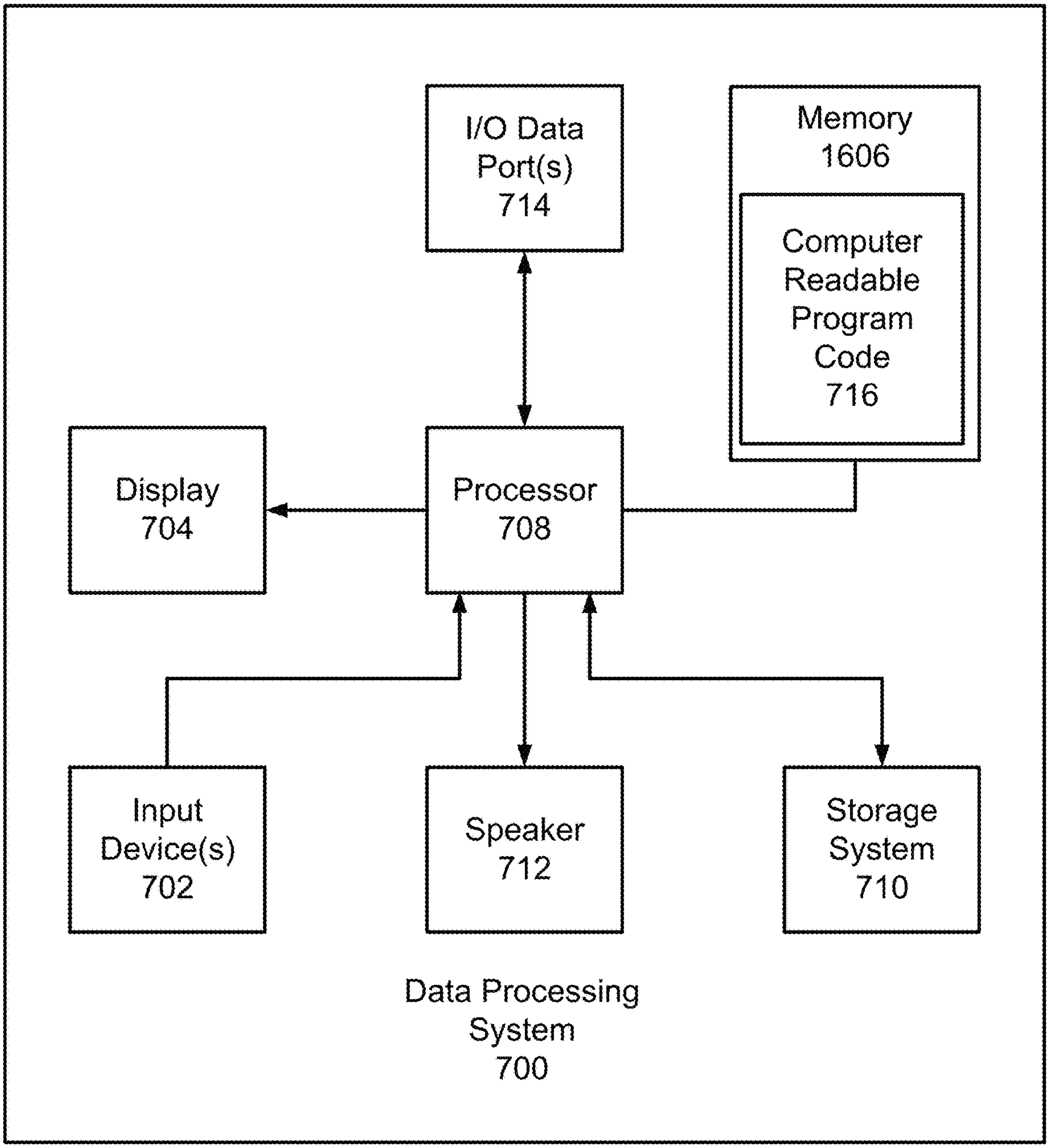
FIG. 7 is a data processing system that may be used to implement the dust detection controller of FIG. 1 in accordance with some embodiments of the inventive concept.

Referring now to FIG. 7, a data processing system 700 that may be used to implement the dust detection controller 110 of FIG. 1, in accordance with some embodiments of the inventive concept, comprises input device(s) 702, such as a keyboard or keypad, a display 704, and a memory 706 that communicate with a processor 708. The data processing system 700 may further include a storage system 710, a speaker 712, and an input/output (I/O) data port(s) 714 that also communicate with the processor 708. The processor 708 may be, for example, a commercially available or custom microprocessor. The storage system 710 may include removable and/or fixed media, such as floppy disks, ZIP drives, hard disks, or the like, as well as virtual storage, such as a RAMDISK. The I/O data port(s) 714 may be used to transfer information between the data processing system 700 and another computer system or a network (e.g., the Internet). The memory 706 may be configured with computer readable program code 716 to perform dust measurements using the dust measurement device and system 100 of FIG. 1.

Figure 8:
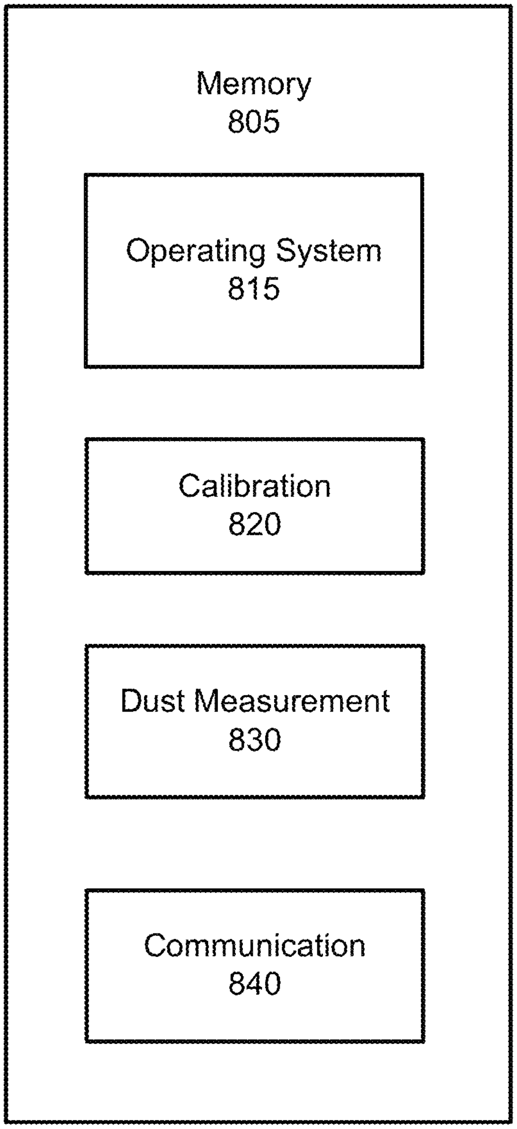
FIG. 8 is a block diagram that illustrates a software/hardware architecture for use in the dust detection controller of FIG. 1 in accordance with some embodiments of the inventive concept.

FIG. 8 illustrates a memory 805 that may be used in embodiments of data processing systems, such as the dust detection controller 110 of FIG. 1 and the data processing system 700 of FIG. 7, respectively, to evaluate the accumulation of dust in an environment and initiate mitigating action to clean or remove the dust if the dust has accumulated to problematic levels. The memory 805 is representative of the one or more memory devices containing the software and data used for facilitating operations of the dust detection controller 110 as described herein. The memory 805 may include, but is not limited to, the following types of devices: cache, ROM, PROM, EPROM, EEPROM, flash, SRAM, and DRAM.

As shown in FIG. 8, the memory 805 may contain six or more categories of software and/or data: an operating system 815, a calibration module 820, a dust measurement module 830, and a communication module 840. In particular, the operating system 815 may manage the data processing system's software and/or hardware resources and may coordinate execution of programs by the processor. The calibration module 820 may be configured to perform one or more of the operations described above with respect to FIGS. 1 and 3-6. The dust measurement module may be configured to perform one or more of the operations described above with respect to FIGS. 1-6. The communication module 1745 may facilitate communication between the dust detection controller 110 and the dust capture apparatus 105 and between the dust detection controller and any entity to which notifications, measurement results, alarms, and/or signals or messages to initiate mitigating action based on the accumulation of dust.

Although FIGS. 7 and 8 illustrate hardware/software architectures that may be used in data processing systems, such as the dust detection controller 110 of FIG. 1 in accordance with some embodiments of the inventive concept, it will be understood that the present invention is not limited to such a configuration but is intended to encompass any configuration capable of carrying out operations described herein.

Computer program code for carrying out operations of data processing systems discussed above with respect to FIGS. 1-8 may be written in a high-level programming language, such as Python, Java, C, and/or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Moreover, the functionality of the dust measurement system 110 and the data processing system 700 of FIG. 7 may each be implemented as a single processor system, a multi-processor system, a multi-core processor system, or even a network of stand-alone computer systems, in accordance with various embodiments of the inventive subject matter. Each of these processor/computer systems may be referred to as a "processor" or "data processing system."

Thus, some embodiments of the inventive concept may provide a dust measurement system that is adaptable to the particular application in which it is deployed. The dust measurement system may use capacitance to estimate the thickness of accumulated dust. The benefits of using capacitance over other techniques is that it is not affected by:

vibration
ambient light
changes in light intensity
dirty lenses

Capacitive proximity sensors can detect a wide variety of materials, including conductive and non-conductive materials, such as metals, plastics, and liquids. They are often used in industrial settings where other sensing methods, such as optical or ultrasonic sensors, may be affected by environmental factors, such as dust, moisture, or temperature.

As described above, the use of a capacitive sensor in a dust measurement device and system has been show by way of experiment to provide a technique for correlating capacitance with dust thickness where the dust serves as at least a portion of the dielectric material between two probes, which act as a capacitor electrodes.

Because different dust may have different materials, particle size, and density, the dust measurement device and system may allow the user to define and set an alarm or notification level when the thickness of the dust is determined to satisfy a threshold.

FURTHER DEFINITIONS AND EMBODIMENTS

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, LabVIEW, dynamic programming languages, such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present disclosure of embodiments has been presented for purposes of illustration and description, but is not intended to be exhaustive or limited to the disclosure in the form disclosed. Many variations and modifications can be made to the embodiments without substantially departing from the principles of the present inventive concept. All such variations and modifications are intended to be included herein within the scope of the present inventive concept.

What is claimed is:

1. A system, comprising:

a collection probe that is configured to collect native dust thereon;

a reading probe that is configurable in a position spaced apart from the collection probe; and a capacitance sensor comprising first and second input leads that are coupled to the collection probe and the reading probe, respectively, that is configured to generate a signal that is representative of a capacitance between the collection probe and the reading probe;

a processor; and a memory coupled to the processor and comprising computer readable program code embodied in the memory that is executable by the processor to perform operations comprising:

correlating the signal with a depth of the native dust on the collection probe; and calibrating the correlation of the signal with the depth of the native dust using a test dust having a known thickness wherein calibrating the correlation of the signal with the depth of the native dust comprises:

placing a slide of the test dust between the collection probe and the reading probe;

wherein the capacitance sensor is further configured to generate a calibration signal that is representative of a calibration capacitance between the collection probe and the reading probe with the slide of test dust therebetween.

2. The system of claim 1, wherein calibrating the correlation of the signal with the depth of the native dust further comprises:

generating a calibration coefficient that is representative of a relationship between the calibration signal and the known thickness of the test dust.

3. The system of claim 2, wherein correlating the signal with the depth of the native dust comprises:

correlating the signal with the depth of the native dust using the calibration coefficient.

4. The system of claim 3, wherein the test dust comprises a non-native dust.

5. The system of claim 3, wherein the test dust comprises a native dust.

6. The system of claim 1, wherein calibrating the correlation of the signal with the depth of the native dust comprises:

sequentially placing a plurality of slides of the test dust between the collection probe and the reading probe, the test dust on each of the plurality of slides having a different known thickness;

wherein the capacitance sensor is further configured to generate a plurality of calibration signals that are each representative of the calibration capacitance between the collection probe and the reading probe with the respective slide of test dust therebetween.

7. The system of claim 6, wherein calibrating the correlation of the signal with the depth of the native dust further comprises:

generating a plurality of calibration coefficients that is representative of a relationship between the plurality of calibration signals and the plurality of known thicknesses of the test dust, respectively.

8. The system of claim 7, wherein correlating the signal with the depth of the native dust comprises:

correlating the signal with the depth of the native dust using one of the plurality of coefficients that is associated with one of the plurality of calibration signals that is closest in value to the signal.

9. The system of claim 1, wherein the operations further comprise:

generating a notification when a depth of the native dust satisfies a threshold.

10. A method, comprising:

collecting native dust on a collection probe having a reading probe spaced apart therefrom;

generating, by a capacitance sensor comprising first and second input leads that are coupled to the collection probe and the reading probe, respectively, a signal that is representative of a capacitance between the collection probe and the reading probe;

correlating the signal with a depth of the native dust on the collection probe; and calibrating the correlation of the signal with the depth of the native dust using a test dust having a known thickness;

wherein calibrating the correlation of the signal with the depth of the native dust comprises:

placing a slide of the test dust between the collection probe and the reading probe; and generating, by the capacitance sensor, a calibration signal that is representative of a calibration capacitance between the collection probe and the reading probe with the slide of test dust therebetween.

11. The method of claim 10, wherein calibrating the correlation of the signal with the depth of the native dust further comprises:

generating a calibration coefficient that is representative of a relationship between the calibration signal and the known thickness of the test dust.

12. The method of claim 11, wherein correlating the signal with the depth of the native dust comprises:

correlating the signal with the depth of the native dust using the calibration coefficient.

13. The method of claim 12, wherein the test dust comprises a non-native dust.

14. The method of claim 12, wherein the test dust comprises a native dust.

15. The method of claim 10, wherein calibrating the correlation of the signal with the depth of the native dust comprises:

sequentially placing a plurality of slides of the test dust between the collection probe and the reading probe, the test dust on each of the plurality of slides having a different known thickness;

generating, by the capacitance sensor, a plurality of calibration signals that are each representative of a calibration capacitance between the collection probe and the reading probe with the respective slide of test dust therebetween; and generating a plurality of calibration coefficients that is representative of a relationship between the plurality of calibration signals and the plurality of known thicknesses of the test dust, respectively;

wherein correlating the signal with the depth of the native dust comprises:

correlating the signal with the depth of the native dust using one of the plurality of coefficients that is associated with one of the plurality of calibration signals that is closest in value to the signal.

16. The method of claim 10, further comprising:

generating a notification when a depth of the native dust satisfies a threshold.

* * * * *